May 5, 1964

J. W. ANDERSON 3,131,413

WINDSHIELD WIPER BLADE

Filed May 18, 1959

INVENTOR.
JOHN W. ANDERSON
BY W. E. Recktenwald
S. A. Crosby
C. S. Penfold
ATTORNEY May 5, 1964 J. W. ANDERSON 3,131,413
WINDSHIELD WIPER BLADE
Filed May 18, 1959 2 Sheets—Sheet 2
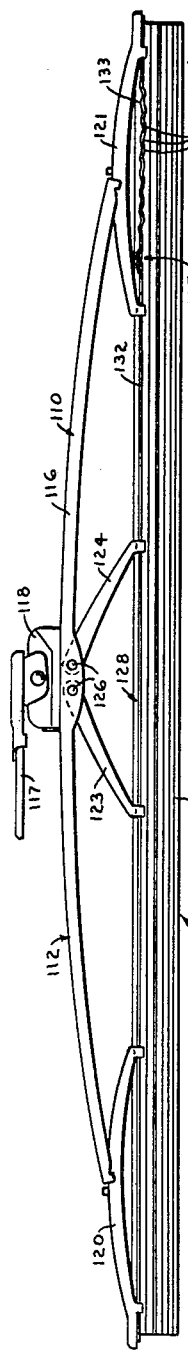
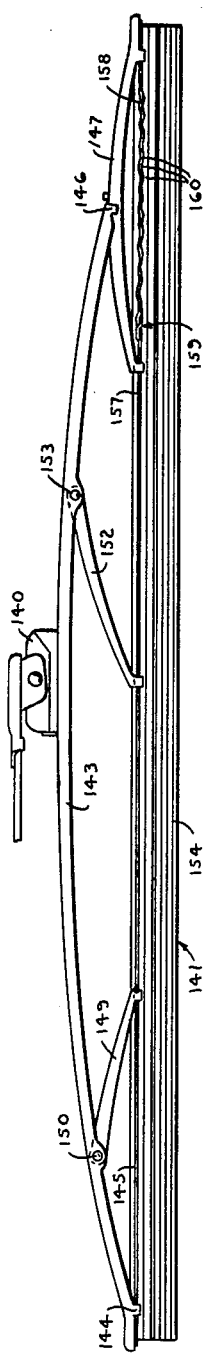
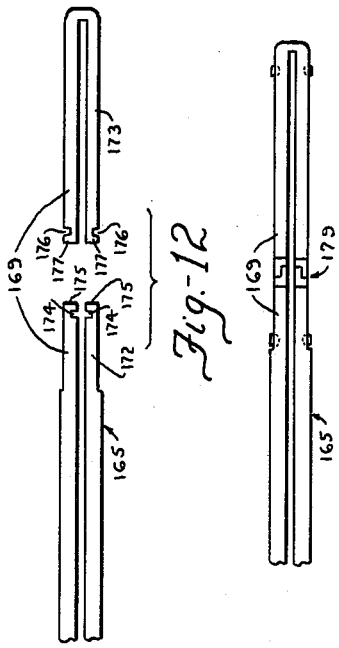
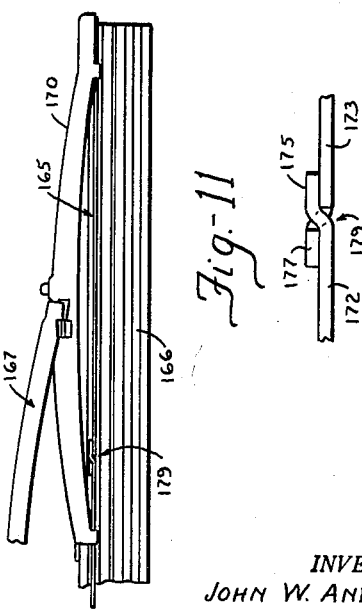
INVENTOR.
JOHN W. ANDERSON
BY W. E. Recktenwald
G. A. Crosby
C. S. Penfield
ATTORNEY

United States Patent Office 3,131,413
Patented May 5, 1964

3,131,413
WINDSHIELD WIPER BLADE
John W. Anderson, 578 Broadway, Gary, Ind.
Filed May 18, 1959, Ser. No. 813,844
9 Claims. (Cl. 15—250.42)

This invention relates to windshield wiper assemblies and more particularly to an improved wiper assembly for wiping not only a flat windshield but also a windshield having curvatures varying in degrees from one area thereof to another.

Applicant's licensee, The Anderson Company, Gary, Indiana, has been manufacturing since 1946 windshield wiper blade assemblies according to applicant's U.S. Patent No. 2,596,063. Volume production of automobiles having curved windshields began in 1946. All curved windshields used on motor vehicles manufactured in the United States and Canada since 1946 and having curved windshields, and as far as is known, all motor vehicles manufactured in foreign countries since 1946 and having curved windshields, have been originally equipped with wiper blade assemblies covered by one or more claims of said U.S. patent.

In the early 1950's there was introduced in one-after-another model of motor vehicles made in the United States so-called "wrap-around" windshields differing radically from the comparatively moderately curved windshields above mentioned. Such windshields are generally larger in area and have at their outer extremities portions curved sharply, usually to bring the extreme sides of the windshield into substantial alignment with the sides of the car body.

Wrap-around windshields have been designed from year to year with varying curvatures adjacent their lateral extremities and, more lately, adjacent also their vertical extremities. This condition creates increasingly serious problems in the provision of wiper equipment to wipe an entire predetermined pattern on the glass—a pattern in part extending outwardly and upwardly.

As this is being written, it may readily be expected that car manufacturers have planned for future models of their vehicles larger and even more irregularly curved windshields than ever before. Engineers for such car manufacturers are admitting—and have changed the relative operational function of the two blades so that at least one of them parks below the regular wipe pattern with the blade extending outwardly. Such engineers are demonstrating in their tests—that no present form of windshield wiper blade assembly will wipe, on such windshields, the entire predetermined pattern extending throughout such larger areas and increased curvatures. The same is true of blades on 1959 model cars now in public use. Urgent inquiries have been received recently for a wiper blade assembly that will wipe in their entirety windshields on present and projected model cars, with such larger patterns, without "skip," without leaving obscured areas within the pattern to obstruct vision, and without the blade extending out of contact with the glass when parked outwardly.

The problems above mentioned have been aggravated by increases in the size of wrap-around windshields and by consequent increases in the length of the wiper blades specified for use thereon. At one period in the use of curved windshields, the maximum length of blade specified and used was twelve inches. Including 1959 and earlier models of motor vehicles, blades sixteen inches in length have been and are being used on a number of models for original equipment. Blades eighteen and twenty inches in length are being tentatively specified for some 1960 and 1961 models of automobiles.

These substantial increases in the length of the blade and size of the windshield have aggravated the problem of conforming the blade to the contour of the windshield at the extreme outward portion of the blade. Windshields are also being curved further back at their tops—thus adding to the problem of keeping the blade in effective full-length contact with the glass.

Some windshields of current design and some projected for the future have one or both of the windshield wiper blades parked on the outboard side of the windshield, in some instances, in a substantially horizontal position along the lower edge portion of the windshield where the curvature is in part relatively severe. Wiper blades currently specified for use on the above windshields, when in the parked position, have the outer end of the blade extending in spaced relation from the windshield an amount varying from one-half inch to several inches along the length of the blade. With a wiper blade parked for a long time in the just-described position, a minor form of set takes place in the rubber along the wiping edge of the blade, at the point where the rubber edge in contact with the glass starts to depart from the glass, there occurs a kink or twist which becomes permanent and impairs the wiping performance of the blade at and adjacent that point, so that streaks occur in the wipe pattern.

My improved blade has substantially continuous contact in conforming to the windshield surface even when parked in the outboard position so that with or without a minor set in the rubber after protracted periods of time in the parked position the blade produces a complete wipe throughout the whole wipe pattern.

I have discovered that a wiper blade made according to the specifications, drawings and claims herewith, readily and successfully wipes throughout its full length the entire predetermined wipe pattern of both currently used and projected wrap-around windshields.

The instant invention in one of its preferred forms may embody a structure generally similar to present commercial blade assemblies manufactured by my licensee, The Anderson Company, for original equipment and for replacement, except for the flexor, sometimes referred to as the backing strip. In one form of the instant invention the flexor is in two longitudinally elongate interlockingly connected portions, one portion extending from the lower extremity of the blade to the proximity of the inner pressure point of the outward secondary yoke as shown in FIGURE 1 of the drawings herewith. This arrangement has substantially the effect of investing the greater part of that portion of the blade lying under said outward secondary yoke with the predetermined desirable characteristics of a wiper blade which has different flexing features than the rest of the blade.

It is to be noted that the flexor construction shown permits using in each portion of the flexor a material particularly adapted to the operating conditions and requirements encountered by that portion. The material selected for a particular portion may be varied in thickness, in flexing characteristics, in cross section and in any other way that would impart the necessary flexibility to the portion.

In the form of flexor shown in FIGURE 8, the transverse convolutions formed in the short portion of the flexor adds in two ways to the yieldability of that portion of the flexor. In the process of forming the convolutions from flat stock, in a suitable forming die, two helpful changes occur. First, the thickness of the material in the convoluted portion is reduced substantially. At the same time, the material is stretched so that the effective length of the convoluted portion is substantially increased, without necessarily increasing its actual over-all length. Both changes add to the yieldability of that portion of the flexor and enable it to conform to and around the sharper curvatures of the windshield.

It will be noted that in the preferred construction shown the outer portion of the flexor is so interlocked with the major portion of the flexor that when in operation it moves with that major portion, it is abutted by the flat side of the overlapping end of said major portion, and in itself abuts likewise said major portion as best shown in FIGURE 5. This abutting feature gives the blade the effect of being one continuous integral unitary flexor.

To meet a condition where an extremely abrupt curvature of the windshield is encountered and where the construction and arrangement shown in FIGURES 1 to 8, inclusive, would require an excessive weakening of the resistance of the shorter portion of the flexor against flexure, by reversing the disposition of the flexor assembly with relation to the windshield, the junction between the longer and shorter portions of the flexor will function as a hinge which will permit ready adaptation of the shorter portion to a curvature with an extremely short radius. To meet such an extreme condition with the construction and arangements shown in FIGURES 1 to 8 would require that the thickness of the shorter, outer portion of the flexor be so greatly reduced as to make that portion of the blade served by the outer portion of the flexor unstable when it encounters areas of the windshield lying toward the mid-part of the windshield, or when the windshield reaches a "wet-dry" condition in which the drag of the rubber against the glass is greatly increased.

There, of course, are many combinations and forms of bridge members, secondary yokes and stabilizing members that may be incorporated, within the teaching of the instant invention, to meet conditions created by varying shapes and sizes of windshields and varying lengths of wiper blades required for use therewith, without departing from the broad concept and spirit of the instant invention.

Other objects and advantages of the invention will become apparent after the description hereinafter set forth is considered in conjunction with the drawings annexed hereto.

In the drawings:

FIGURE 9 is a side view in elevation of a further modified form of my invention incorporated in the combination;

FIGURE 10 is a side view in elevation of still a further modified form of my invention;

FIGURE 11 is an enlarged view of the outer right-hand portion of a wiper blade incorporating a further modified form of my invention;

FIGURE 12 is a partial bottom view of the backing strip or flexor of FIGURE 11 shown with the portions separated;

FIGURE 13 is a partial top view of the backing strip or flexor of FIGURE 11 with the portions engaged together and showing the sliding claws of the pressure-transmitting means; and FIGURE 14 is a side view of the flexor hinge connection taken along the lines 14—14 of FIGURE 13.

Figure 1:
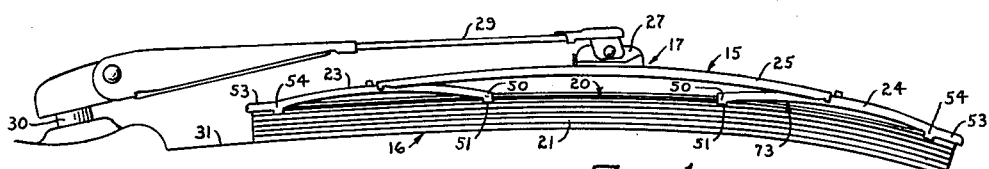
FIGURE 1 is a side view in elevation of one preferred form of my improved windshield wiper blade assembly as applied to a windshield.
Figure 2:
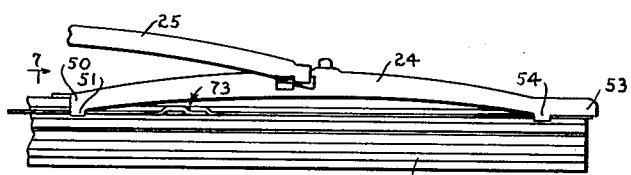
FIGURE 2 is an enlarged view of the outer right-hand portion of the full assembly of FIGURE 1 removed from the windshield.

Referring to the drawings and particularly to FIGURES 1 to 5 and 7, the windshield wiper assembly is generally designated 15 and is comprised of a wiper blade 16 and a pressure-distributing superstructure 17. The wiper blade 16 is comprised of an elongate freely and resiliently flexible support, backing strip, or flexor 20 and a resilient rubberlike element 21 connected with the flexor. The pressure-distributing superstructure or transmitting device 17 may be constructed in various ways but, as herein illustrated, preferably includes a pair of corresponding secondary yokes 23, 24 having their ends slidably connected with the blade 16, a primary yoke 25 having its ends pivotally connected with intermediate portions of the secondary yokes 23 and 24, and a connector 27 carried by the yoke for connection with a wiper arm 29 which is oscillatably mounted on a pivot shaft 30 to permit movement of the wiper blade across the surface of a windshield 31.

The flexor 20, as illustrated and as described in detail hereinafter, is elongate and has corresponding end portions 33, 34 and an intermediate portion 35 of greater width than the end portions. This variation in width forms shoulders which provide longitudinally spaced abutment means 37, 38. The flexor 20 is preferably provided with an elongate narrow slot 40 terminating short of the ends of the flexor to provide integral connections 41 whereby longitudinal parallel side portions 42, 43 of the flexor can be manipulated so that the resilient element 21 can be properly located therein. Due to the characteristics of the flexor 20, the wiper blade 16 is primarily limited to flexation or movement in a plane substantially perpendicular to a surface to be cleaned and is substantially inflexible in a plane lying transverse thereto.

The wiping element 21 is provided with an attaching portion 45 (FIGURE 7) and a wiping portion 46, which is joined to the attaching portion by an intermediate restricted portion or web 47 so as to permit tilting of the wiping portion. The attaching portion 45 is provided with a pair of corresponding grooves 48, one being located adjacent each side of the attaching portion in a predetermined position so that they lie substantially in the same plane. The grooves 48 receive the intermarginal edge portions of the slot 40 in the longitudinally extending sides 42, 43 of the flexor 20 for holding said flexor and wiping element 21 assembled.

The secondary yokes 23, 24 are, in this assembly, preferably identical in design and construction. The inner end of each secondary yoke is formed to provide a transverse arcuate or curved portion 50 and a pair of corresponding ears or claws 51. The outer end of each secondary yoke is provided with a shroudlike end wall 53 which serves to conceal the ends of the flexor 20. The outer end of each of the secondary yokes 23, 24 is also provided with a pair of ears or claws 54 (similar to claws 51, FIGURE 7) spaced inwardly from the end wall 53. When assembled with the blade the pairs of ears or claws 51, 54 of the yoke 23 extend over the reduced extremity 33 of the flexor 20 and the corresponding ears or claws 51, 54 of the yoke 24 similarly extend over the extremity 34 of the flexor 20 to effect a sliding feature between the yokes and the flexor. The secondary yokes 23 and 24 are preferably assembled with the flexor 20 by merely sliding the yokes inwardly of the extremities of the yokes until the inner ends of the yokes engage the abutment means 37, 38 after which the primary yoke 25 is attached to the secondary yokes in a manner shown and described in my copending application Serial No. 609,631 filed September 13, 1956, now Patent No. 2,955,313.

It is to be understood that the subject invention is not intended to be limited to the above-described pressure-transmitting system or to the particular form of shouldered flexor, as various other constructions and arrangements may be employed within the broad teaching or spirit of the invention. These elements are being shown and described for illustration purposes only.

The freely and reversely flexible flexor 20 is provided with means whereby, when included as a part of a complete wiper blade, a wiper assembly is produced which satisfactorily wipes existing and projected flat and/or curved windshields. In addition, the wiper blade assembly provides an improved and satisfactory wipe throughout its length on sharply curved wrap-around windshields as well as being susceptible of successful use in longer wiper blades for completely wiping enlarged and extended curved surfaces of windshields projected for use on future models of automobiles. That is, on a windshield with an extreme curvature, particularly on the outboard side portions thereof, it is necessary for the wiper blade 16 comprising the wiping element 21 and flexor 20 (lying preferably beneath the outermost secondary yoke 24) to flex or bend in the plane lying substantially perpendicular to the surface of the windshield to a much greater extent than for older type curved windshields.

Figure 3:
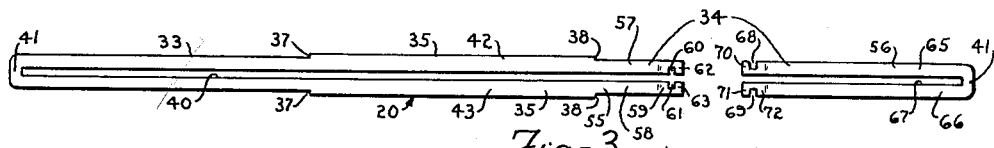
FIGURE 3 is a bottom view of the backing strip or flexor of FIGURE 1 shown with the portions separated.

In one form of my invention, such as shown in FIGURES 1–5 and 7, inclusive, the flexor 20 has the pairs of claws 51, 54 of the secondary yokes 23, 24 embracing the side edges of the reduced end portions 33, 34 of the flexor. The flexor has the end portion 34 generally outwardly positioned with respect to the pivot shaft 30 of the wiper system. As shown in FIGURE 3, the end portion 34 is divided into two elongate longitudinal portions or parts 55, 56 aligned axially with each other along the longitudinal axis of the flexor. The portion 55 of the end portion 34 has two legs or sides 57, 58 which are integrally formed with the sides 42, 43, of the intermediate portion 35, respectively, of the flexor with the abutments 38 therebetween.

Figures 5, 6:
FIGURE 5 is a side view of the flexor taken along the lines 5—5 of FIGURE 4.
FIGURE 6 is a side view similar to FIGURE 5 showing a modified form of flexor structure.
Figure 7:
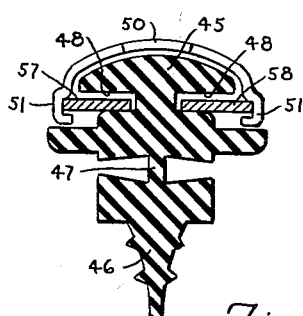
FIGURE 7 is an enlarged cross-sectional view of the blade taken along the lines 7—7 of FIGURE 2.

The legs or sides 57, 58 have formed in the edges of the slot 40 a pair of matching and facing notches 60, 61, respectively, so as to form the inwardly extending end lugs 62, 63 axially spaced from, but joined with, the sides 57, 58. As shown in FIGURE 5, the outer ends of the legs or sides 57, 58 from the base of the notches 60, 61 to the ends of the legs are formed in the same plane as the sides 57, 58 with an intermediate part 59 formed or offset upwardly into a plane lying substantially parallel to the plane of the sides 57, 58. The other portion or part 56 of the flexor 20 is comprised of two substantially parallel legs or sides 65, 66 joined by the connection 41 so as to define a slot 67 which is a part of the slot 40 of the portion 55 of the flexor 20. A pair of outwardly facing notches 68, 69 are formed in the outer edges of the sides 65, 66 so as to form the outwardly extending end lugs 70, 71 axially spaced from, but joined with, the sides 65, 66. The outer ends of the sides 65, 66, from the base of the notches 68, 69 to the ends of the sides 65, 66 including the lugs 70, 71 are formed in the same plane as the sides 65, 66, with an intermediate part 72 formed or offset upwardly into a plane lying substantially parallel to the plane of the sides 65, 66 (FIGURE 5).

As best shown in FIGURE 5, the end portion 56 is formed of a material having a reduced thickness as compared both with the thickness of the portion 55 as well as with the thickness of the rest of the flexor. The thinner portion 56 of the flexor is more flexible in the plane perpendicular to the windshield than the balance of the flexor so as to more readily conform the wiping element to the windshield surface under the pressure of the wiper arm.

The legs or sides 57, 58 of the portion 55 are separately grasped and are spread apart an amount sufficient to permit the legs or sides 65, 66 of the portion 56 to be inserted therebetween with the notches 60, 61 of the portion 55 aligned with the notches 69, 69 of the portion 56, respectively. Release of the legs or sides 57, 58 of the portion 55 moves the lugs 62, 63 into interfitting relation with the legs or sides 65, 66 of the portion 56 and simultaneously moves the lugs 70, 71 into interfitting relation with the legs or sides 57, 58 of portion 55 whereupon the flexor 20 of the present invention is formed. The lugs 70, 71 on the sides 65, 66 of the portion 56 are adapted to engage, during normal operation of the blade, with the bottom face of the part 59 of the sides 57, 58 of the portion 55 while the lugs 62, 63 on the legs 57, 58 on the portion 55 are adapted to engage with the bottom face of the part 72 of the sides 65, 66 such that the two portions of the flexor are interlockingly connected with each other in such a way that a substantially unitary flexor is produced.

The flexor 20 is free to be assembled with the wiping element 21 either by the usual method shown and described in U.S. Patent No. 2,782,445 issued to Fred A. Krohm or by various alternative means. One such alternative means of assemblying the flexor to the blade comprises threading the two portions 55, 56 into the grooves in the squeegee from opposite ends of the squeegee whereupon the sides 57, 58 of the portion 55 are spread apart for interlocking connection with the portion 56 as above described. The secondary yokes 23, 24 are threaded onto the end portions 33, 34, respectively, of the flexor with the pairs of claws 51, 54 of each yoke embracing the edge portions of the flexor. The bridge member 25 is attached to the secondary yokes 23, 24 to produce the blade assembly 15.

Figure 4:
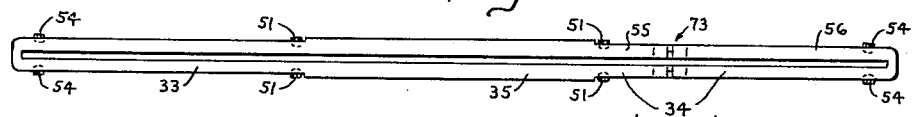
FIGURE 4 is a top view of the backing strip or flexor of FIGURE 1 with the portions engaged together and showing the underengaging sliding claws of the pressure-transmitting means.

FIGURE 4 shows the claws 51, 54 of the yoke 23 embracing the end portion 33 of the flexor 20 with the claws 51, 54 of the yoke 24 engaging the end portion 34 of the flexor. The claws 51 on the yoke 24 are in relatively close proximity to the abutments 38 and are in engagement with the sides 57, 58 of the portion 55 of the end 34 of the flexor. The claws 54 on the other end of the yoke 24 engage with the outer edge portions of the sides 65, 66 of the portion 56 near the outer end of the end portion 34 of the flexor such that the secondary yoke 24 straddles the interlocking connection 73.

With the wiper blade 15 attached to the arm 29 and urged against the windshield 31, the pressure-transmitting superstructure 17 is slidably attached to and bears upon the flexor and wiping element as described above and shown in FIGURE 1 so that the pressure from the wiper arm 29 is transmitted through said superstructure to the flexor or backing strip 20 at the spaced points under the claws 51 and 54 and then to the wiping element 21.

The offset relationship between the intermediate parts 59 and 72 on the respective portions 55, 56 of the end portion 34 of the flexor provides an interlock between the respective portions 55, 56 when the respective lugs 62, 63 and 70, 71 engage in abutting relationship with the under planar faces of the parts 59, 72. The abutment of the lugs with the parts 59, 72 occurs when the two portions 55, 56 lie substantially in a common plane and continues that way throughout the normal flexing of the blade toward the windshield so that once the abutment therebetween takes place the flexor is in effect a unitary flexor and functions substantially as a unitary flexor.

The interlocking connection 73 is adapted to permit the flexor to flex toward and away from the surface to be wiped in a plane substantially perpendicular to said surface and at the same time substantially locks the two portions 55, 56 of the flexor against lateral flexing or distortion in a plane substantially transverse to the last-named plane. In this way, the lateral stability of the flexor and blade is maintained while the flexor and blade is adapted to more readily bend and flex in the plane substantially perpendicular to the surface to be wiped.

In the illustrated form of the invention, the predetermined pressures, at the contact points of the pressure-distributing assembly with the flexor, remain substantially constant, so that while the interlocked outer portion of the flexor responds effectively to sharp curvatures, the pressures at each end of each portion are normal predetermined proportionate pressures that substantially insure satisfactory conformity of the wiping edge of the rubber element to the windshield throughout the entire length of that element and throughout the entire stroke of the blade.

FIGURE 6 illustrates a modified form of my invention wherein the outer portion 75 of the end portion 76 of the flexor is formed of a different material, but has substantially the same thickness as compared to the thickness of the portion 77 of the rest of the flexor. The intermediate parts 78, 79 of the portions 75, 77, respectively are in a plane offset upwardly from the plane of the portions 75, 77 in the same way as described with respect to FIGURES 1-5 and 7 except that the amount of offset is the same so as to provide a firm interfitting and interlocking connection 80 between the separate portions 75, 77 of the flexor. From the just-described modifications, it is believed to be obvious that the thickness and/or width of the outer end portion of any flexor could be varied within a wide range together with variations in the degree of springiness as caused by the use of different types of materials so as to accomplish the best results desired without departing from the spirit of my invention.

Figure 8:
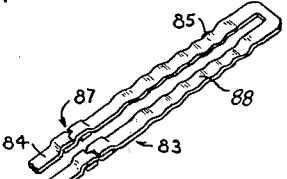
FIGURE 8 is a partial perspective view of a further modified form of backing strip or flexor incorporating my invention.

FIGURE 8 shows a further modified form of my invention wherein the end portion 83 of a flexor is separated into two unitary elongate portions 84, 85 which are interconnected together at 87 in the manner similar to that described with respect to FIGURES 1-5 and 7. The part 85 has transverse corrugations or convolutions 88 formed therein with the crests of the corrugations oriented in a direction substantially perpendicular to the longitudinal axis of the flexor.

FIGURES 9 through 10 illustrate two further modified forms of my invention incorporating in combination the feature of pressure-free stabilizer means with the improved interengaging flexor means and the convoluted end portion described hereinbefore.

FIGURE 9 shows a wiper blade assembly particularly adapted for use as a longer blade. The wiper blade assembly is designated 110 and comprises a pressure-transmitting superstructure 112 and a wiper blade 114. The superstructure 112 comprises an elongate bridge member 116 adapted for connection to a wiper arm 117 through a connection 118. The bridge member 116 is pivotally connected at its ends to a pair of secondary yokes 120, 121 which in turn are slidably connected with the wiper blade 114 at longitudinally spaced points.

Interposed between the blade 114 and the bridge member 116 is a pair of pressure-free stabilizer members 123, 124 each one of which is pivotally connected at one end portion by a pin 126 to the intermediate portion of the bridge 116. The other end portion of the stabilizers 123, 124 are shaped to slidably embrace the edge portions of a backing strip 128 of the wiper blade 114. The stabilizers 123, 124 have unimpeded, pressure-free movement in the plane common to the longitudinal axes of the superstructure and the blade member so as to stabilize intermediate portions of the wiper blade 114 against chatter, lateral distortion and torsional deflection, all substantially as shown and described in my copending application Serial No. 760,391, now Patent No. 2,920,336.

The wiper blade 114 comprises a rubberlike wiping element 130 having the elongate freely and reversely flexible backing strip or flexor 128 operatively connected therewith. The flexor 128 is divided into two elongate longitudinal portions or parts 132 and 133 axially aligned with each other along the axis of the blade. The outer portion 133 is interlockingly connected to the other portion 132 at the connection 135. The connection 135 is of the same general type described in detail with respect to FIGURES 1-5. The outer portion 133 has transverse convolutions 137 of the type shown and described above with respect to FIGURE 8.

The wiper blade assembly is adapted to wipe in an improved manner a windshield having enlarged surfaces to be wiped and having sharply curved wrap-around portions. Various combinations of the elements shown and described with respect to FIGURE 9 can be effected without departing from the scope and spirit of my invention.

FIGURE 10 shows another modified form of my invention wherein a pressure-distributing superstructure 140 is operatively connected with a wiper blade 141. The superstructure 140 comprises a bridge member 143 slidably connected at one end 144 to a flexor 145 of the wiper blade and pivotally connected at its other end 146 to a secondary yoke 147. The yoke 147 is slidably connected with the flexor 145 of the blade at longitudinally spaced points. A pressure-free stabilizer member 149 is pivotally connected by pin 150 with the bridge member near one end portion of the bridge and is slidably connected with the flexor 145 of the wiper blade at a point longitudinally spaced inward from the end of the blade. A second pressure-free stabilizer member 152 is pivotally connected by a pin 153 with the bridge member at a point spaced outwardly from the center of the bridge member and said member 152 extends in the direction of the center portion of the wiper blade and is slidably connected with the flexor 145. Both stabilizer members 149, 152 have unimpeded, pressure-free movement in the plane containing the axes of the superstructure and wiper blade so as to stabilize the respective portions of the wiper blade against chatter, lateral distortion and torsional deformation.

The wiper blade comprises a resiliently flexible squeegee element 154 and the freely and reversely flexible backing means or flexor 145. The flexor is divided into two portions 157, 158 which are interlockingly connected together at 159 for flexing movement in the plane of the axes of the superstructure and wiper blade. The interlocking connection 159 operates as described above. The outer portion 158 has transverse convolutions 160 as described above also. Various combinations of elements just described can be made without departing from the spirit or scope of my invention.

In a further modified form of my invention shown in FIGURES 11-14, inclusive, the flexor 165 is operatively associated with the wiping element 166 and pressure-transmitting superstructure 167 in substantially the same way as discussed above with respect to FIGURE 1. The flexor 165 has the end portion 169, underneath the outer yoke 170 of the superstructure 167, separated into two elongate longitudinal portions 172, 173 aligned axially with each other. The portion 172 has a pair of aligned notches 174 formed therein with a pair of aligned lugs 175 on the ends of the portion 172 formed or offset upwardly into a plane lying substantially parallel to the plane of the portion 172. The other portion 173 has a pair of oppositely facing notches 176 formed therein with a pair of lugs 177 formed or offset upwardly into a plane lying substantially parallel to the plane of the portion 173.

With the portions 172 and 173 interconnected, the lugs 175 on the portion 172 overlap the upper surface of the portion 173 and the lugs 177 on the portion 173 overlap the upper surface of the portion 172, as best shown in FIGURE 14, to form a hinge connection between the portions 172, 173. The interlocking connection between portions 172, 173 produces an interfitting hingelike structure 179 wherein the portion 173 is hingedly mounted relative to the portion 172 about an axis substantially perpendicular to the longitudinal axis of the blade. When a blade having a flexor like the flexor 165 encounters a substantially flat portion of a windshield, the lugs 175, 177 engage the respective upper surfaces of the portions 173 and 172 so as to restrict in one direction the hinging movement beyond normal alignment in the plane containing the portions of the flexor. Under this last-named condition, the flexor operates as a unitary flexor as described with respect to FIGURES 1-5.

The outwardly disposed end portion 169 of the flexor 165 under the pressure from the pressure points of the superstructure 167 hinges about the interlocked connection 179 in the direction of the windshield so as to conform the blade to the surface of the windshield. Longitudinally separating portions of the backing strip which are hingedly or otherwise connected together at said separation has the effect of reducing the resistance of the end portion 169 to flexing. Part of the improved adaptability of the wiper blade to conform to the surface of a windshield results from the fact that the outer shorter portion 173 of the flexor 165 is hinged to the inner portion 172 so as to eliminate the resistance or "spring back" between the two portions 172, 173 when they are integrally joined together. The resistance to conforming to sharp curvatures in some prior structures is created by the "spring back" influence upon the outer short portion, which influence is present when the two portions are integral and the flexor is curved under arm pressure. The physical separation between the two portions 172, 173 permits each portion to flex substantially independently of the other toward or away from the windshield under pressure from the respective ends of the secondary yoke 170. The hinge connection joins the respective portions 172, 173 together within practical limits so that no "spring back" or resistance from the one portion 172 is transmitted to the other portion 173.

It is to be understood to be within the scope of this invention to provide interlocking connections 73 in both end portions 33 and 34 whereby a substantially symmetrical flexor is produced which is adapted to be assembled with a wiping element 21. The resulting wiper blade 16 is adapted for use not only as part of a wiper blade assembly 15 for original equipment on new type automobiles, but also as a refill element for use in the replacement trade. When the flexor is formed with an interlocking connection 73 in each end portion 33, 34 a clip or fastener is provided between the sides of the flexor for holding the central portion of the flexor assembled with the end portions and with the wiping element 21. The interlocking connections of FIGURES 6 and 8 and the interlocking hinge 179 of FIGURES 11–14 are also adapted for use in one or both end portions of the flexor. Various combinations of an interlocking connection of FIGURES 1–8 and interlocking hinge of FIGURES 11–14 may be made without departing from the spirit or scope of this invention.

Having thus described my invention, it is obvious that various modifications may be made in the same without departing from the spirit of the invention; and, therefore, I do not wish to be understood as limiting myself to the exact forms, constructions, arrangements and combinations of parts herein shown and described.

I claim:

1. In a windshield wiper assembly and in combination, an elongate flexible blade having a wiping edge, freely and reversely flexible elongate backing means connected with said flexible blade, said backing means comprising at least two separate axially aligned portions defining an end portion and another portion, said end portion being more flexible than said other portion, pressure-transmitting means extending lengthwise of said blade and being slidably connected with said backing means, and means for connecting said end portion with said other portion of the backing means whereby said pressure-transmitting means urges said end portion into conformance with the more abruptly curved portions of the windshield and urges said other portion into conformance with the less abruptly curved portions of the windshield.

2. A windshield wiper comprising in combination an elongate flexible blade having a wiping edge, freely and reversely flexible elongate backing means associated with said flexible blade, said backing means having an end portion and a separate second portion disposed adjacent thereto and in substantial alignment with each other along a longitudinal extent, said end portion being more flexible than said second portion and being disposed for relative movement in a common plan with said second portion, pressure-transmitting means extending lengthwise of said blade and being slidably connected with said backing means, and means for interlockingly connecting said portions of the backing means together to form a substantially continuous flexor throughout the length of the blade.

3. In a windshield wiper assembly and in combination, a wiper blade comprising an elongate wiping member having a wiping edge, elongate resiliently flexible backing means carried by said member and coactive therewith, pressure-applying means connected with said blade and adapted to receive pressure from a windshield wiper arm and apply that pressure at a plurality of spaced-apart points on said blade, said backing means comprising two separate substantially aligned portions held in interlocked relationship for flexing in a common plane substantially perpendicular to a windshield being wiped, one of said portions being an outer end portion disposed adjacent the outer end of the blade, said outer end portion having cross-sectional and lineal dimensional characteristics differing from those present in the portion extending therefrom toward the inner end of the blade, to provide greater flexibility of the outer end portion of said backing means to permit it to conform to more abrupt curvatures of the windshield encountered in the outer portion thereof.

4. In a windshield wiper blade assembly and in combination an elongate flexible blade having a wiping edge, freely and reversely flexible elongate backing means operatively associated with said flexible blade, said backing means including two separate portions defining an end portion and a second portion disposed adjacent thereto and in substantial alignment therewith, said end portion being more flexible than said second portion, pressure-transmitting means extending lengthwise of said blade and being slidably connected with said backing means at spaced-apart points thereon, means for maintaining said end portion in hinged relationship with said second portion, and means for restricting in one direction hinging movement of said end portion beyond normal alignment with said second portion.

5. In a wiper blade for curved windshields and in combination, a resilient elongate wiping element, a resiliently and reversely flexible elongate pressure-transmitting backing strip associated coactively therewith, said backing strip having a plurality of separate elongate portions axially aligned with each other, a pressure-transmitting superstructure adapted to receive pressure from a windshield wiper arm and being slidably connected with said elongate portions of the backing strip to transmit said pressure thereto, and means for joining successive longitudinal elongate portions of the backing strip together, said last-named means comprising spaced lug means on the ends of each adjoining portion which lug means are adapted to engage the underface of the respective adjoining unitary portion so as to provide a substantially continuous backing strip for a wiper blade, whereby said backing strip conforms to the curvature of the surface of the windshield to be wiped.

6. A windshield wiper blade assembly comprising in combination an elongate flexible blade having a wiping edge, freely and reversely flexible elongate backing means operatively associated with said flexible blade, said backing means including separate elongate portions defining an end portion and a second portion disposed adjacent thereto and in substantial alignment therewith, pressure-transmitting means extending lengthwise of said blade and being slidably connected with said backing means at spaced-apart points thereon, means for hingedly connecting said end portion with said second portion, and means for restricting in one direction hinging movement of said end portion beyond normal alignment with said second portion.

7. A windshield wiper assembly comprising in combination an elongate flexible blade having a wiping edge, freely and reversely flexible backing means operatively associated with said flexible blade and coactive therewith, said backing means comprising a plurality of longitudinally extending separate portions axially aligned with each other along a longitudinal axis in interconnected relationship, said blade being adapted to receive a pressure-transmitting superstructure extending lengthwise of the flexible blade and connected with said backing means at spaced-apart points thereon, one of said points being adjacent the juncture between said axially aligned portions, one of said portions being provided with a plurality of deformations disposed transverse to its longitudinal axis whereby to reduce its resistance to flexure.

8. A windshield wiper comprising in combination: an elongate flexible blade having a wiping portion and a back portion, elongate flexible backing means received on the back portion of the flexible blade and adapted to permit flexure of the blade in a plane toward the surface to be wiped and resist flexure in a plane substantially transverse to the first-mentioned direction, said backing means adapted to receive pressure-transmitting means thereon at spaced-apart locations, said backing means comprising a plurality of longitudinally disposed separate portions in interlocking engagement and with at least one of the portions having less resistance to flexure than another portion, said backing means having laterally disposed integral portions affording said interlocking engagement thereby preventing relative lateral movement between the portions.

9. A wiper blade for curved windshields comprising, a resilient elongate wiping element and a resiliently and reversely flexible elongate backing means associated coactively with said element, said backing means having a pair of strips, one of said strips comprising an intermediate longitudinally extending wide portion, an extremity having a width less than that of said wide portion extending longitudinally therefrom in one direction and an extension having a width less than that of said wide portion extending longitudinally therefrom in an opposite direction, the other strip having a width substantially corresponding to that of said extremity and extension, said extension and said other strip having ends which are directly interconnected in a manner whereby each strip constitutes an axial continuation of the other, said strips are dimensionally different in their structural formation so as to provide inherently a comparative difference in their resistance to flexing.

References Cited in the file of this patent

UNITED STATES PATENTS

| | | |
|---|---|---|
| 2,548,090 | Anderson | Apr. 10, 1951 |
| 2,601,664 | Nesson | June 24, 1952 |
| 2,782,445 | Krohm | Feb. 26, 1957 |
| 2,796,623 | Nesson | June 25, 1957 |
| 2,814,821 | Wallis | Dec. 3, 1957 |
| 2,859,468 | O'Shei | Nov. 11, 1958 |
| 2,918,688 | O'Shei | Dec. 29, 1959 |
| 2,920,336 | Anderson | Jan. 12, 1960 |
| 2,985,904 | Hart | May 30, 1961 |